United States Patent
Aoki et al.

(10) Patent No.: US 11,114,250 B2
(45) Date of Patent: Sep. 7, 2021

(54) SOLID ELECTROLYTIC CAPACITOR FORMED FROM CONDUCTIVE POLYMER PARTICLES

(71) Applicant: AVX Corporation, Fountain Inn, SC (US)

(72) Inventors: Kiyofumi Aoki, Shiga Pref. (JP); Jan Petrzilek, Usti nad Orlici (CZ)

(73) Assignee: AVX Corporation, Fountain Inn, SC (US)

( * ) Notice: Subject to any disclaimer, the term of this patent is extended or adjusted under 35 U.S.C. 154(b) by 40 days.

(21) Appl. No.: 16/536,699

(22) Filed: Aug. 9, 2019

(65) Prior Publication Data

US 2020/0051750 A1 Feb. 13, 2020

Related U.S. Application Data

(60) Provisional application No. 62/717,130, filed on Aug. 10, 2018.

(51) Int. Cl.

| | | |
|---|---|---|
| *H01G 9/028* | (2006.01) | |
| *H01G 9/07* | (2006.01) | |
| *C08G 61/12* | (2006.01) | |
| *C08L 25/06* | (2006.01) | |
| *H01G 9/042* | (2006.01) | |

(Continued)

(52) U.S. Cl.
CPC .......... *H01G 9/028* (2013.01); *C08G 61/126* (2013.01); *C08L 25/06* (2013.01); *H01G 9/042* (2013.01); *H01G 9/052* (2013.01); *H01G 9/07* (2013.01); *H01G 9/15* (2013.01)

(58) Field of Classification Search
CPC ........ H01G 9/028; H01G 9/042; H01G 9/052; H01G 9/07; H01G 9/15; H01G 9/012; H01G 9/0425; H01G 9/045; H01G 9/0525; H01G 9/08; H01G 9/025; C08G 61/126; C08L 25/06
See application file for complete search history.

(56) References Cited

U.S. PATENT DOCUMENTS

| | | | |
|---|---|---|---|
| 3,889,357 A | 6/1975 | Millard et al. | |
| 5,111,327 A | 5/1992 | Blohm et al. | |

(Continued)

FOREIGN PATENT DOCUMENTS

| | | |
|---|---|---|
| CN | 102768903 A | 11/2012 |
| CN | 103854868 A | 6/2014 |

(Continued)

OTHER PUBLICATIONS

Merker et al., "New Conducting Polymer Dispersions for Solid Electrolyte Capacitors," *CARTS Europe 2005* (Prague, Czech Republic), Oct. 17-20, 2005, 6 pages.

(Continued)

*Primary Examiner* — Michael P McFadden
(74) *Attorney, Agent, or Firm* — Dority & Manning, P.A.

(57) ABSTRACT

A solid electrolytic capacitor containing a capacitor element is provided. The capacitor element contains a sintered porous anode body, a dielectric that overlies the anode body, a solid electrolyte that overlies the dielectric that includes conductive polymer particles that contain a complex formed from a thiophene polymer and a copolymer counterion, and an external polymer coating that overlies the solid electrolyte and includes conductive polymer particles.

29 Claims, 4 Drawing Sheets

(51) Int. Cl.
*H01G 9/052* (2006.01)
*H01G 9/15* (2006.01)

(56) References Cited

U.S. PATENT DOCUMENTS

| | | | |
|---|---|---|---|
| 5,457,862 A | 10/1995 | Sakata et al. |
| 5,473,503 A | 12/1995 | Sakata et al. |
| 5,729,428 A | 3/1998 | Sakata et al. |
| 5,812,367 A | 9/1998 | Kudoh et al. |
| 6,197,252 B1 | 3/2001 | Bishop et al. |
| 6,369,239 B2 | 4/2002 | Rauchschwalbe et al. |
| 6,430,033 B1 | 8/2002 | Mitsui et al. |
| 6,528,662 B2 | 3/2003 | Jonas |
| 6,635,729 B1 | 10/2003 | Groenendaal et al. |
| 6,674,635 B1 | 1/2004 | Fife et al. |
| 6,771,488 B2 | 8/2004 | Takagi et al. |
| 6,805,816 B1 | 10/2004 | Groenendaal et al. |
| 6,891,016 B2 | 5/2005 | Reuter et al. |
| 6,987,663 B2 | 1/2006 | Merker et al. |
| 7,008,562 B2 | 3/2006 | Jonas et al. |
| 7,053,174 B2 | 5/2006 | Kirchmeyer et al. |
| 7,102,016 B2 | 9/2006 | Reuter |
| 7,118,690 B2 | 10/2006 | Wessling et al. |
| 7,154,740 B2 | 12/2006 | Merker et al. |
| 7,183,419 B2 | 2/2007 | Heuer et al. |
| 7,199,251 B2 | 4/2007 | Kirchmeyer et al. |
| 7,288,663 B2 | 10/2007 | Kirchmeyer et al. |
| 7,341,801 B2 | 3/2008 | Reuter et al. |
| 7,358,326 B2 | 4/2008 | Heuer et al. |
| 7,363,511 B2 | 4/2008 | Kiiveri |
| 7,377,947 B2 | 5/2008 | Merker et al. |
| 7,411,779 B2 | 8/2008 | Merker et al. |
| 7,449,588 B2 | 11/2008 | Jonas et al. |
| 7,497,879 B2 | 3/2009 | Kakuma et al. |
| 7,515,396 B2 | 4/2009 | Biler |
| 7,563,290 B2 | 7/2009 | Qiu et al. |
| 7,585,983 B2 | 9/2009 | Reuter et al. |
| 7,621,970 B2 | 11/2009 | Furusawa et al. |
| 7,649,730 B2 | 1/2010 | Jones et al. |
| 7,750,099 B2 | 7/2010 | Chikusa et al. |
| 7,771,621 B2 | 8/2010 | Kuramoto et al. |
| 7,785,493 B2 | 8/2010 | Jonas et al. |
| 7,859,829 B2 | 12/2010 | Kakuma et al. |
| 7,872,858 B2 | 1/2011 | Kakuma et al. |
| 7,923,475 B2 | 4/2011 | Jonas et al. |
| 7,938,866 B2 | 5/2011 | Biler |
| 7,938,986 B2 | 5/2011 | Elschner et al. |
| 7,951,901 B2 | 5/2011 | Reuter et al. |
| 7,972,534 B2 | 7/2011 | Merker et al. |
| 7,973,180 B2 | 7/2011 | Morita et al. |
| 7,990,683 B2 | 8/2011 | Qiu et al. |
| 7,990,684 B2 | 8/2011 | Sugihara et al. |
| 7,994,345 B2 | 8/2011 | Brassat et al. |
| 8,058,135 B2 | 11/2011 | Merker et al. |
| 8,090,548 B2 | 1/2012 | Abdennadher et al. |
| 8,195,490 B2 | 6/2012 | Tambe et al. |
| 8,224,681 B2 | 7/2012 | Tambe et al. |
| 8,310,815 B2 | 11/2012 | Freeman et al. |
| 8,313,538 B2 | 11/2012 | Merker et al. |
| 8,323,361 B2 | 12/2012 | Freeman et al. |
| 8,334,331 B2 | 12/2012 | Elschner et al. |
| 8,364,511 B2 | 1/2013 | Tambe et al. |
| 8,419,809 B2 | 4/2013 | Ishimaru |
| 8,420,671 B2 | 4/2013 | Reuter et al. |
| 8,426,542 B2 | 4/2013 | Sugihara et al. |
| 8,451,588 B2 | 5/2013 | Biler |
| 8,456,803 B2 | 6/2013 | Merker et al. |
| 8,462,484 B2 | 6/2013 | Kakuma et al. |
| 8,493,713 B2 | 7/2013 | Biler et al. |
| 8,535,812 B2 | 9/2013 | Totsuka et al. |
| 8,576,543 B2 | 11/2013 | Biler et al. |
| 8,592,520 B2 | 11/2013 | Kirchmeyer et al. |
| 8,663,505 B2 | 3/2014 | Loevenich et al. |
| 8,696,767 B2 | 4/2014 | Shibuya |
| 8,696,768 B2 | 4/2014 | Merker et al. |
| 8,699,208 B2 | 4/2014 | Merker et al. |
| 8,702,817 B2 | 4/2014 | Ishimaru |
| 8,721,928 B2 | 5/2014 | Jonas et al. |
| 8,721,929 B2 | 5/2014 | Loevenich et al. |
| 8,771,381 B2 | 7/2014 | Chen et al. |
| 8,808,403 B2 | 8/2014 | Qiu et al. |
| 8,837,114 B2 | 9/2014 | Kamiyama et al. |
| 8,882,856 B2 | 11/2014 | Intelmann et al. |
| 8,902,567 B2 | 12/2014 | Chacko |
| 8,936,735 B2 | 1/2015 | Guntermann et al. |
| 8,940,191 B2 | 1/2015 | Nobuta et al. |
| 9,030,807 B2 | 5/2015 | Chacko et al. |
| 9,034,211 B2 | 5/2015 | Meguro et al. |
| 9,053,839 B2 | 6/2015 | Lövenich |
| 9,058,916 B2 | 6/2015 | Meguro et al. |
| 9,087,994 B2 | 7/2015 | Lövenich et al. |
| 9,111,680 B2 | 8/2015 | Intelmann et al. |
| 9,208,954 B2 | 12/2015 | Matsuura et al. |
| 9,236,191 B2 | 1/2016 | Chacko et al. |
| 9,251,961 B2 | 2/2016 | Merker et al. |
| 9,287,051 B2 | 3/2016 | Aoyama et al. |
| 9,287,053 B2 | 3/2016 | Ishimaru |
| 9,296,921 B2 | 3/2016 | Okamoto et al. |
| 9,312,074 B2 | 4/2016 | Chacko et al. |
| 9,343,239 B2 | 5/2016 | Zhang et al. |
| 9,362,055 B2 | 6/2016 | Sugihara et al. |
| 9,373,448 B2 | 6/2016 | Majima et al. |
| 9,378,896 B2 | 6/2016 | Sugimura |
| 9,384,866 B2 | 7/2016 | Jibiki et al. |
| 9,406,445 B2 | 8/2016 | Petrzilek et al. |
| 9,455,092 B2 | 9/2016 | Sugawara et al. |
| 9,460,860 B2 | 10/2016 | Sugihara et al. |
| 9,466,432 B2 | 10/2016 | Aoyama et al. |
| 9,472,348 B2 | 10/2016 | Takatani et al. |
| 9,502,183 B2 | 11/2016 | Saulter et al. |
| 9,508,491 B2 | 11/2016 | Merker et al. |
| 9,514,888 B2 | 12/2016 | Merker et al. |
| 9,514,889 B2 | 12/2016 | Asteman et al. |
| 9,530,568 B2 | 12/2016 | Takatani et al. |
| 9,589,734 B2 | 3/2017 | Koseki et al. |
| 9,589,738 B2 | 3/2017 | Sugihara et al. |
| 9,595,396 B2 | 3/2017 | Matsuura et al. |
| 9,640,325 B2 | 5/2017 | Tagawa et al. |
| 9,672,989 B2 | 6/2017 | Uher et al. |
| 9,718,905 B2 | 8/2017 | Yano et al. |
| 9,754,697 B2 | 9/2017 | Onodera et al. |
| 9,756,697 B2 | 9/2017 | Odnoblyudov et al. |
| 9,761,347 B2 | 9/2017 | Shi et al. |
| 9,761,377 B2 | 9/2017 | Nobuta et al. |
| 9,761,378 B2 | 9/2017 | Shi et al. |
| 9,767,963 B2 | 9/2017 | Uher et al. |
| 9,779,881 B2 | 10/2017 | Ishimaru |
| 9,818,549 B2 | 11/2017 | Chacko |
| 9,875,852 B2 | 1/2018 | Asteman et al. |
| 9,892,859 B2 | 2/2018 | Takatani et al. |
| 9,928,964 B1 | 3/2018 | Jin et al. |
| 9,941,055 B2 | 4/2018 | Chacko et al. |
| 9,953,767 B2 | 4/2018 | Sugihara et al. |
| 9,959,981 B2 | 5/2018 | Merker et al. |
| 9,972,444 B2 | 5/2018 | Petrzilek et al. |
| 9,972,445 B2 | 5/2018 | Koseki et al. |
| 9,991,055 B2 | 6/2018 | Uher et al. |
| 10,014,016 B1 | 7/2018 | Mehfuz et al. |
| 10,026,521 B2 | 7/2018 | Scheel et al. |
| 10,049,822 B2 | 8/2018 | Sugihara et al. |
| 10,062,519 B2 | 8/2018 | Freeman et al. |
| 10,090,111 B2 | 10/2018 | Liu et al. |
| 10,109,421 B2 | 10/2018 | Chacko et al. |
| 10,109,427 B2 | 10/2018 | Ishikawa et al. |
| 10,109,428 B2 | 10/2018 | Shi et al. |
| 10,138,382 B2 | 11/2018 | Lovenich et al. |
| 10,147,551 B2 | 12/2018 | Intelmann et al. |
| 10,147,552 B2 | 12/2018 | Takatani et al. |
| 10,186,382 B2 | 1/2019 | Uher et al. |
| 10,208,160 B2 | 2/2019 | Sugihara et al. |
| 10,236,128 B2 | 3/2019 | Tsubaki et al. |
| 10,242,799 B2 | 3/2019 | Chacko et al. |
| 10,249,442 B2 | 4/2019 | Liu et al. |
| 10,283,715 B2 | 5/2019 | Schumann et al. |

(56) References Cited

U.S. PATENT DOCUMENTS

| | | | |
|---|---|---|---|
| 10,340,091 B2 | 7/2019 | Bunha et al. | |
| 10,475,591 B2 | 11/2019 | Vilc et al. | |
| 10,570,520 B2 | 2/2020 | Jin et al. | |
| 10,650,980 B2 | 5/2020 | Bunha et al. | |
| 10,658,121 B2 | 5/2020 | Bunha et al. | |
| 10,741,333 B2 | 8/2020 | Nakata et al. | |
| 10,767,003 B2 | 9/2020 | Scheel et al. | |
| 2005/0175861 A1 | 8/2005 | Elschner et al. | |
| 2005/0202274 A1 | 9/2005 | Elschner et al. | |
| 2008/0232030 A1* | 9/2008 | Jones | H01G 9/14 361/503 |
| 2009/0011226 A1 | 1/2009 | Takeuchi et al. | |
| 2009/0035532 A1 | 2/2009 | Bando et al. | |
| 2011/0019340 A1 | 1/2011 | Nobuto et al. | |
| 2011/0026190 A1 | 2/2011 | Oohata | |
| 2011/0233450 A1 | 9/2011 | Nobuta et al. | |
| 2013/0242464 A1 | 9/2013 | Biler et al. | |
| 2013/0273514 A1 | 10/2013 | Tambe et al. | |
| 2013/0342967 A1 | 12/2013 | Lai et al. | |
| 2014/0022702 A1* | 1/2014 | Petrzilek | H01G 9/0036 361/525 |
| 2014/0145118 A1 | 5/2014 | Lovenich et al. | |
| 2015/0092319 A1* | 4/2015 | Tatsuno | H01G 9/0003 361/525 |
| 2016/0104580 A1 | 4/2016 | Maeshima et al. | |
| 2017/0194068 A1 | 7/2017 | Onodera | |
| 2017/0236647 A1 | 7/2017 | Intelmann et al. | |
| 2018/0047988 A1 | 2/2018 | Seuring et al. | |
| 2018/0108487 A1 | 4/2018 | Petrzilek et al. | |
| 2018/0244838 A1 | 8/2018 | Miyamoto et al. | |
| 2018/0330888 A1 | 11/2018 | Shi et al. | |
| 2019/0062501 A1 | 2/2019 | Onodera et al. | |
| 2019/0148080 A1 | 5/2019 | Fukui et al. | |
| 2019/0311857 A1 | 10/2019 | Bunha et al. | |
| 2020/0051751 A1 | 2/2020 | Uher et al. | |
| 2020/0051757 A1 | 2/2020 | Uher et al. | |
| 2020/0118766 A1 | 4/2020 | Miyamoto et al. | |
| 2020/0152393 A1 | 5/2020 | Shi et al. | |
| 2020/0185157 A1 | 6/2020 | Uher | |

FOREIGN PATENT DOCUMENTS

| | | | |
|---|---|---|---|
| CN | 104409213 | 3/2015 | |
| CN | 105405657 A | 3/2016 | |
| CN | 105405661 A | 3/2016 | |
| CN | 105551801 A | 5/2016 | |
| CN | 206040440 U | 3/2017 | |
| EP | 0384694 | 8/1990 | |
| EP | 0384694 A2 * | 8/1990 | C08L 65/00 |
| EP | 1 100 097 B1 | 8/2008 | |
| EP | 2 305 686 A1 | 4/2011 | |
| EP | 2695904 | 2/2014 | |
| EP | 3 318 589 A1 | 5/2018 | |
| JP | 2008311582 A | 12/2008 | |
| JP | 2010129651 A | 6/2010 | |
| JP | 2010153625 A | 7/2010 | |
| JP | 2011009499 A | 1/2011 | |
| JP | 2011009568 A | 1/2011 | |
| JP | 2011009569 A | 1/2011 | |
| JP | 2011114208 A | 6/2011 | |
| JP | 2011135020 A | 7/2011 | |
| JP | 2011195764 A | 10/2011 | |
| JP | 2011199086 A | 10/2011 | |
| JP | 2011199087 A | 10/2011 | |
| JP | 2011199088 A | 10/2011 | |
| JP | 2011216752 A | 10/2011 | |
| JP | 2011253878 A | 12/2011 | |
| JP | 2012015425 A | 1/2012 | |
| JP | 2012025887 A | 2/2012 | |
| JP | 2012049432 A | 3/2012 | |
| JP | 2012174948 A | 9/2012 | |
| JP | 2012188400 A | 10/2012 | |
| JP | 2012191127 A | 10/2012 | |
| JP | 2012199364 A | 10/2012 | |
| JP | 2012244077 A | 12/2012 | |
| JP | 2013006969 A | 1/2013 | |
| JP | 2013055308 A | 3/2013 | |
| JP | 2013074212 A | 4/2013 | |
| JP | 2013116939 A | 6/2013 | |
| JP | 2013127045 A | 6/2013 | |
| JP | 2013163793 A | 8/2013 | |
| JP | 2013251359 A | 12/2013 | |
| JP | 2013251408 A | 12/2013 | |
| JP | 2014003322 A | 1/2014 | |
| JP | 2014007401 A | 1/2014 | |
| JP | 2014011218 A | 1/2014 | |
| JP | 2014011222 A | 1/2014 | |
| JP | 2014024905 A | 2/2014 | |
| JP | 2014027040 A | 2/2014 | |
| JP | 2014041888 A | 3/2014 | |
| JP | 2014043500 A | 3/2014 | |
| JP | 2014060231 A | 4/2014 | |
| JP | 2014093417 A | 5/2014 | |
| JP | 2014135525 A | 7/2014 | |
| JP | 2014198827 A | 10/2014 | |
| JP | 2014201545 A | 10/2014 | |
| JP | 5637544 B2 | 12/2014 | |
| JP | 5663871 B2 | 2/2015 | |
| JP | 20150211100 A | 2/2015 | |
| JP | 2015095616 A | 5/2015 | |
| JP | 2015105315 A | 6/2015 | |
| JP | 2015118978 A | 6/2015 | |
| JP | 5745881 B2 | 7/2015 | |
| JP | 2015165550 A | 9/2015 | |
| JP | 5807997 B2 | 11/2015 | |
| JP | 2016009770 A | 1/2016 | |
| JP | 5892535 B2 | 3/2016 | |
| JP | 5911136 B2 | 4/2016 | |
| JP | 5954798 B2 | 7/2016 | |
| JP | 2016135839 A | 7/2016 | |
| JP | 5988824 B2 | 9/2016 | |
| JP | 5988831 B2 | 9/2016 | |
| JP | 5998836 B2 | 9/2016 | |
| JP | 6015243 B2 | 10/2016 | |
| JP | 6015244 B2 | 10/2016 | |
| JP | 6024264 B2 | 11/2016 | |
| JP | 2016188348 A | 11/2016 | |
| JP | 6096727 B2 | 3/2017 | |
| JP | 2017045868 A | 3/2017 | |
| JP | 2017048291 A | 3/2017 | |
| JP | 2017057267 A | 3/2017 | |
| JP | 2017095589 A | 6/2017 | |
| JP | 2017101102 A | 6/2017 | |
| JP | 6180010 B2 | 8/2017 | |
| JP | 20117141409 A | 8/2017 | |
| JP | 6201595 B2 | 9/2017 | |
| JP | 2017171759 A | 9/2017 | |
| JP | 2017188640 A | 10/2017 | |
| JP | 6256970 B2 | 1/2018 | |
| JP | 6273917 B2 | 2/2018 | |
| JP | 6311355 B2 | 4/2018 | |
| JP | 2018090755 A | 6/2018 | |
| JP | 6379523 B2 | 8/2018 | |
| JP | 2018123213 A | 8/2018 | |
| JP | 6415146 B2 | 10/2018 | |
| JP | 6427887 B2 | 11/2018 | |
| JP | 2018184586 A | 11/2018 | |
| JP | 2018193513 A | 12/2018 | |
| JP | 2018204029 A | 12/2018 | |
| JP | 6462255 B2 | 1/2019 | |
| JP | 6485074 B2 | 3/2019 | |
| WO | WO 2006/088033 A1 | 8/2006 | |
| WO | WO 2008/036909 A2 | 3/2008 | |
| WO | WO 2010/095650 A1 | 8/2010 | |
| WO | WO 2010/095651 A1 | 8/2010 | |
| WO | WO 2010/095652 A1 | 8/2010 | |
| WO | WO 2012/014844 A1 | 2/2012 | |
| WO | WO 2015/119047 A1 | 8/2015 | |
| WO | WO 2016/111277 A1 | 7/2016 | |

(56) References Cited

FOREIGN PATENT DOCUMENTS

WO      WO 2018/097085 A1      5/2018
WO      WO 2019/026961 A1      2/2019

OTHER PUBLICATIONS

Merker et al., "Conducting Polymer Dispersions for High-Capacitance Tantalum-Capacitors," *CARTS Europe 2006*, 6 pages.
Safety Data Sheet for Selftron®S (Prototype) from Tosoh Corporation, Nov. 1, 2016, 9 pages.
Product Information on Self-doped Conductive Polymer TS-CP90 from Tosoh Corporation, 1 page.
Simpson et al., "Advances and Applications of Inherently Conductive Polymer Technologies Based on Poly(3,4-Ethylenedioxythiophene)," *2005 AIMCAL Fall Technical Conference and 19th International Vacuum Web Coating Conference* (Myrtle Beach, SC), Oct. 16-20, 2005, Session 5: Advances in Technology, 10 pages.
Ye et al., "Freestanding flexible polymer films based on bridging of two EDOT units with functionalized chains for use in long-term-stable capacitors," *New J. Chem.*, 2018, 42, pp. 4824-4834.
Related Application Form.
International Search Report and Written Opinion for PCT/US2019/045890 dated Nov. 25, 2019, 11 Pages.
International Search Report for PCT/US2020/051459 dated Dec. 13, 2020, 13 pages.

\* cited by examiner

SOLID ELECTROLYTIC CAPACITOR FORMED FROM CONDUCTIVE POLYMER PARTICLES

CROSS REFERENCE TO RELATED APPLICATION

The present application claims filing benefit of U.S. Provisional Patent Application Ser. No. 62/717,130 having a filing date of Aug. 10, 2018, which is incorporated herein by reference in its entirety.

BACKGROUND OF THE INVENTION

Solid electrolytic capacitors (e.g., tantalum capacitors) are typically made by pressing a metal powder (e.g., tantalum) around a metal lead wire, sintering the pressed part, anodizing the sintered anode, and thereafter applying a solid electrolyte. Intrinsically conductive polymers are often employed as the solid electrolyte due to their advantageous low equivalent series resistance ("ESR") and "non-burning/non-ignition" failure mode. For example, such electrolytes can be formed through in situ chemical polymerization of a 3,4-dioxythiophene monomer ("EDOT") in the presence of a catalyst and dopant. However, conventional capacitors that employ in situ polymerized polymers tend to have a relatively high leakage current ("DCL") and fail at high voltages, such as experienced during a fast switch on or operational current spike. In an attempt to overcome these issues, dispersions have also been employed that are formed from a complex of poly(3,4-ethylenedioxythiophene) and poly (styrene sulfonic acid ("PEDOT:PSS"). While the PEDOT:PSS dispersions can result in improved leakage current values, other problems nevertheless remain. For example, one problem with polymer slurry-based capacitors is that they can achieve only a relatively low percentage of their wet capacitance, which means that they have a relatively large capacitance loss and/or fluctuation in the presence of atmosphere humidity.

As such, a need exists for an improved solid electrolytic capacitor that exhibits relatively stable electrical properties.

SUMMARY OF THE INVENTION

In accordance with one embodiment of the present invention, a solid electrolytic capacitor is disclosed that contains a capacitor element. The capacitor element contains a sintered porous anode body, a dielectric that overlies the anode body, a solid electrolyte that overlies the dielectric that includes conductive polymer particles that contain a complex formed from a thiophene polymer and a copolymer counterion, and an external polymer coating that includes conductive polymer particles.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
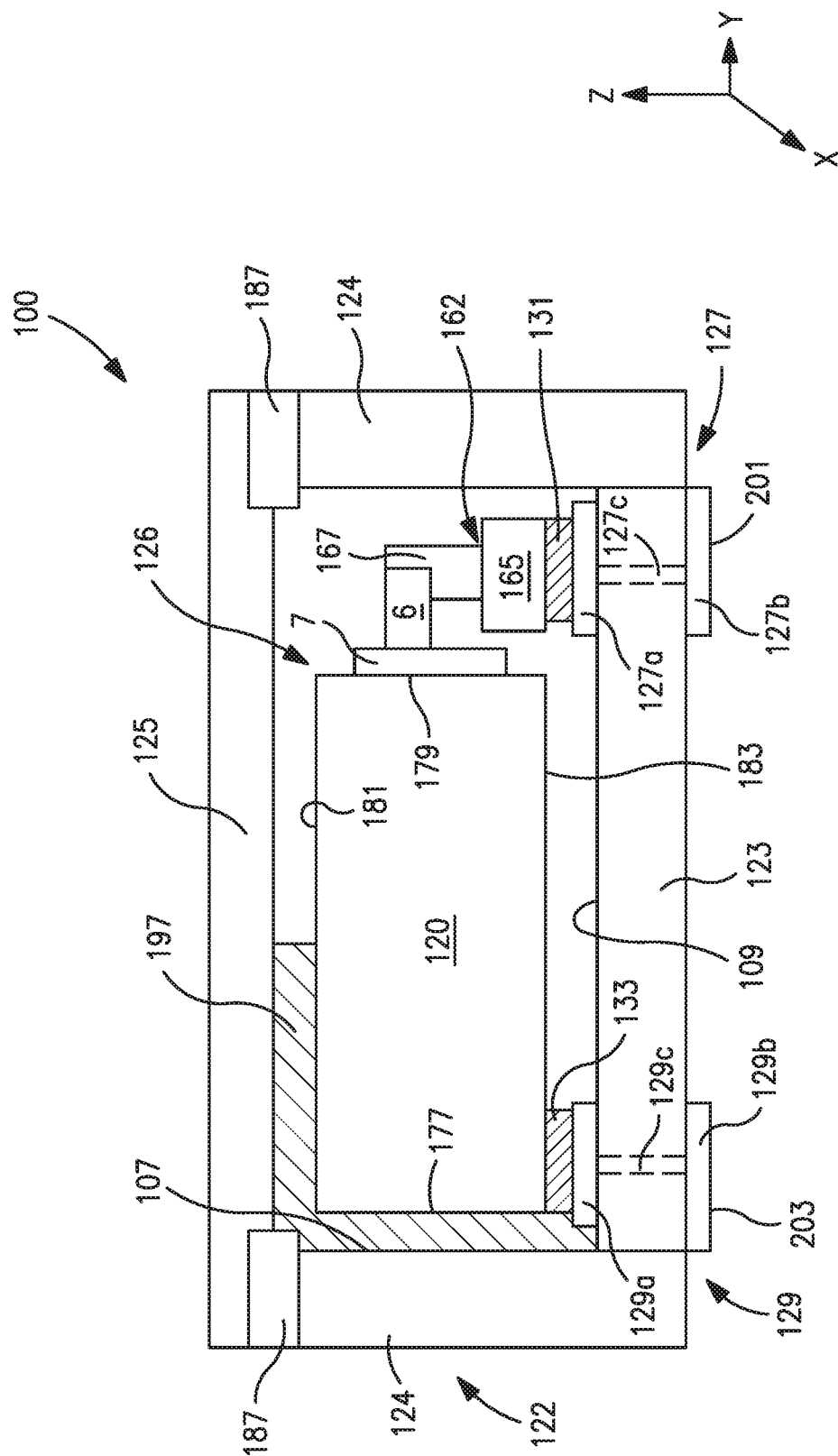
FIG. 1 is a cross-sectional view of one embodiment of a capacitor of the assembly of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that contains a capacitor element including a porous anode body, dielectric overlying the anode body, and solid electrolyte overlying the dielectric. To help facilitate the use of the capacitor in high voltage applications, it is generally desired that the solid electrolyte is formed from a plurality of conductive polymer particles and an external polymer coating that is also formed from a conductive polymer particles. In this manner, the capacitor element may remain generally free of high energy radicals (e.g., $Fe^{2+}$ or $Fe^{3+}$ ions) that can lead to dielectric degradation, particularly at relatively high voltages (e.g., above about 60 volts). Notably, the conductive polymer particles employed in the solid electrolyte contain a complex formed by a thiophene polymer and a copolymer counterion. Without intending to be limited by theory, it is believed that such particles can help improve certain electrical properties of the resulting capacitor. The capacitor may, for example, exhibit a relatively high "breakdown voltage" (voltage at which the capacitor fails), such as about 85 volts or more, in some embodiments about 90 volts or more, in some embodiments about 95 volts or more, and in some embodiments, from about 100 volts to about 300 volts, such as determined by increasing the applied voltage in increments of 3 volts until the leakage current reaches 1 mA. Likewise, the capacitor may also be able to withstand relatively high surge currents, which is also common in high voltage applications. The peak surge current may be, for example, about 100 Amps or more, in some embodiments about 200 Amps or more, and in some embodiments, and in some embodiments, from about 300 Amps to about 800 Amps. The capacitor may also exhibit a high percentage of its wet capacitance, which enables it to have only a small capacitance loss and/or fluctuation in the presence of atmosphere humidity. This performance characteristic is quantified by the "capacitance recovery", which is determined by the equation:

Recovery=(Dry Capacitance/Wet Capacitance)×100

The capacitor may exhibit a capacitance recovery of about 80% or more, in some embodiments about 85% or more, and in some embodiments, from about 85% to 100%. The dry capacitance may be about 1 milliFarad per square centimeter ("m $F/cm^2$") or more, in some embodiments about 2 $mF/cm^2$ or more, in some embodiments from about 5 to about 50 $mF/cm^2$, and in some embodiments, from about 8 to about 20 $mF/cm^2$, measured at a frequency of 120 Hz.

The capacitor can also exhibit other improved electrical properties. For instance, after being subjected to an applied voltage (e.g., 120 volts) for a period of time from about 30 minutes to about 20 hours, in some embodiments from about 1 hour to about 18 hours, and in some embodiments, from about 4 hours to about 16 hours, the capacitor may exhibit a leakage current ("DCL") of only about 100 microamps ("µA") or less, in some embodiments about 70 µA or less, and in some embodiments, from about 1 to about 50 µA. Notably, the capacitor may exhibit such low DCL values even under dry conditions, such as described above.

Other electrical properties of the capacitor may also be good and remain stable under various conditions. For example, the capacitor may exhibit a relatively low equivalence series resistance ("ESR"), such as about 200 mohms, in some embodiments less than about 150 mohms, in some embodiments from about 0.1 to about 125 mohms, and in some embodiments, from about 1 to about 100 mohms, measured at an operating frequency of 100 kHz and temperature of 23° C. The capacitor may also exhibit a dry capacitance of about 30 nanoFarads per square centimeter ("nF/cm$^2$") or more, in some embodiments about 100 nF/cm$^2$ or more, in some embodiments from about 200 to about 3,000 nF/cm$^2$, and in some embodiments, from about 400 to about 2,000 nF/cm$^2$, measured at a frequency of 120 Hz at temperature of 23° C. Notably, such electrical properties (e.g., ESR and/or capacitance) can still remain stable even at high temperatures and/or dry conditions as noted above. For example, the capacitor may exhibit an ESR and/or capacitance value within the ranges noted above even after being exposed to a temperature of from about 80° C. or more, in some embodiments from about 100° C. to about 150° C., and in some embodiments from about 105° C. to about 130° C. (e.g., 105° C. or 125° C.) for a substantial period of time, such as for about 100 hours or more, in some embodiments from about 150 hours to about 3000 hours, and in some embodiments, from about 200 hours to about 2500 hours (e.g., 240 hours). In one embodiment, for example, the ratio of the ESR and/or capacitance value of the capacitor after being exposed to the high temperature (e.g., 125° C.) for 240 hours to the initial ESR and/or capacitance value of the capacitor (e.g., at 23° C.) is about 2.0 or less, in some embodiments about 1.5 or less, and in some embodiments, from 1.0 to about 1.3.

It is also believed that the dissipation factor of the capacitor may be maintained at relatively low levels. The dissipation factor generally refers to losses that occur in the capacitor and is usually expressed as a percentage of the ideal capacitor performance. For example, the dissipation factor of the capacitor is typically about 250% or less, in some embodiments about 200% or less, and in some embodiments, from about 1% to about 180%, as determined at a frequency of 120 Hz.

Various embodiments of the capacitor will now be described in more detail.

I. Capacitor Element

A. Anode Body

The capacitor element includes an anode that contains a dielectric formed on a sintered porous body. The porous anode body may be formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluorotantalate ($K_2TaF_7$), sodium fluorotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The specific charge of the powder typically varies from about 2,000 to about 600,000 microFarads*Volts per gram ("µF*V/g") depending on the desired application. For instance, in certain embodiments, a high charge powder may be employed that has a specific charge of from about 100,000 to about 600,000 µF*V/g, in some embodiments from about 120,000 to about 500,000 µF*V/g, and in some embodiments, from about 150,000 to about 400,000 µF*V/g. In other embodiments, a low charge powder may be employed that has a specific charge of from about 2,000 to about 100,000 µF*V/g, in some embodiments from about 5,000 to about 80,000 µF*V/g, and in some embodiments, from about 10,000 to about 70,000 µF*V/g. As is known in the art, the specific charge may be determined by multiplying capacitance by the anodizing voltage employed, and then dividing this product by the weight of the anodized electrode body.

The powder may be a free-flowing, finely divided powder that contains primary particles. The primary particles of the powder generally have a median size (D50) of from about 5 to about 500 nanometers, in some embodiments from about 10 to about 400 nanometers, and in some embodiments, from about 20 to about 250 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead to the anode body may also be accomplished using other known techniques, such as by welding the lead to the body or embedding it within the anode body during formation (e.g., prior to compaction and/or sintering).

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1800° C., in some embodiments from about 800° C. to about 1700° C., and in some embodiments, from about 900° C. to about 1400° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

B. Dielectric

The anode is also coated with a dielectric. As indicated above, the dielectric is formed by anodically oxidizing ("anodizing") the sintered anode so that a dielectric layer is formed over and/or within the anode. For example, a tantalum (Ta) anode may be anodized to tantalum pentoxide ($Ta_2O_5$).

Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); glycols (e.g., ethylene glycol, propylene glycol, etc.); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent(s) may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, an ionic compound is generally employed that is capable of dissociating in the solvent to form ions. Suitable ionic compounds for this purpose may include, for instance, acids, such as nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

To form the dielectric, a current is typically passed through the electrolyte while it is in contact with the anode body. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 5 to about 200 V, and in some embodiments, from about 10 to about 150 V. During oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process may be employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, the electrolyte employed during at least one stage of the dielectric development process contains an ionic compound as explained above. In one particular embodiment, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an ionic compound that is an acid, such as nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage may likewise contain an ionic compound that is a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer, is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Solid Electrolyte

A solid electrolyte overlies the dielectric and generally functions as the cathode for the capacitor. As indicated above, the solid electrolyte includes at least one layer formed by a plurality of conductive polymer particles. The particles likewise contain a complex formed by a thiophene polymer and a copolymer counterion. In certain embodiments, the thiophene polymer may contain repeating units having the following general formula (I):

wherein, $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and q is an integer from 0 to 8, in some embodiments, from 0 to 2, and in one embodiment, 0. In one particular embodiment, "q" is 0 and the polymer is poly(3,4-ethylenedioxythiophene). One commercially suitable example of a monomer suitable for forming such a polymer is 3,4-ethylenedioxthiophene, which is available from Heraeus under the designation Clevios™ M.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

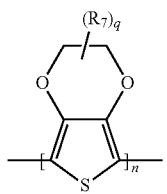

Methods for forming conductive polymers, such as described above, are well known in the art. For instance, U.S. Pat. No. 6,987,663 to Merker, et al. describes various techniques for forming substituted polythiophenes from a monomeric precursor. The monomeric precursor may, for instance, have the following structure:

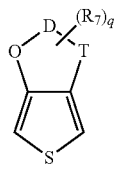

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxythiophene is available from Heraeus under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst may be a transition metal salt, such as a salt of an inorganic or organic acid that contain ammonium, sodium, gold, iron(III), copper(II), chromium(VI), cerium(IV), manganese(IV), manganese(VII), or ruthenium(III) cations. Particularly suitable transition metal salts include halides (e.g., $FeCl_3$ or $HAuCl_4$); salts of other inorganic acids (e.g., $Fe(ClO_4)_3$, $Fe_2(SO_4)_3$, $(NH_4)_2S_2O_8$, or $Na_3Mo_{12}PO_{40}$); and salts of organic acids and inorganic acids comprising organic radicals. Examples of salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned salts may also be used.

The copolymer counterion may be combined with the thiophene polymer after it is formed, or alternatively incorporated during polymerization. Typically, the weight ratio of the copolymer counterions to thiophene polymers is from about 0.5:1 to about 50:1, in some embodiments from about 1:1 to about 30:1, and in some embodiments, from about 2:1 to about 20:1. The weight of the polymers corresponds referred to the above-referenced weight ratios refers to the weighed-in portion of the monomers used, assuming that a complete conversion occurs during polymerization.

The copolymer counterion generally contains a first repeating unit derived from a sulfonic acid monomer and a second repeating unit derived from a (meth)acrylate monomer. As used herein, the term "(meth)acrylate" generally refers to any monomer containing or being derived from an acrylic or methacrylic compound, such as acrylate monomers, methacrylate monomers, (acrylate), silane monomers contain an (meth)acrylate functional group, etc. Typically, the weight ratio of the first repeating unit (sulfonic acid monomer) to the second repeating unit ((meth)acrylate monomer) ranges from about 0.5:1 to about 30:1, in some embodiments from about 1:1 to about 25:1, and in some embodiments, from about 3:1 to about 15:1. The weight average molecular weight of the resulting copolymer counterion also typically ranges from about 5,000 to about 500,000 grams per mole, in some embodiments from about 15,000 to about 400,000 grams per mole, and in some embodiments, from about 40,000 to about 200,000 grams per mole.

Suitable sulfonic acid monomers may include, for instance, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aromatic sulfonic acids optionally substituted by $C_1$ to $C_{20}$ alkyl groups (e.g., styrene sulfonic acid, benzene sulfonic acid, o-toluene sulfonic acid, p-toluene sulfonic acid, etc.); and so forth. Suitable (meth)acrylate monomers may include, for instance, alkyl (meth)acrylates (e.g., methyl (meth)acrylate, ethyl (meth) acrylate, propyl (meth)acrylate, butyl (meth)acrylate, hexyl (meth)acrylate, stearyl (meth)acrylate, etc.; cycloalkyl (meth)acrylates (e.g., cyclohexyl (meth)acrylate); aryl (meth)acyrlates (e.g., diphenylbutyl (meth)acrylate); alkylamino (meth)acrylates (e.g., dimethylaminoethyl (meth) acrylate, diethylaminoethyl (meth)acrylate, etc.); hydroxyalkyl (meth)acrylates (e.g., hydroxymethyl (meth)acrylate, hydroxyethyl (meth)acrylate, hydroxypropyl (meth)acrylate, hydroxybutyl (meth)acrylate, hydroxyhexyl (meth) acrylate, hydroxystearyl (meth)acrylate, hydroxypolyoxyethylene (meth)acrylate, methoxyhydroxypropyl (meth) acrylate, ethoxyhydroxypropyl (meth)acrylate, dihydroxypropyl (meth)acrylate, dihydroxybutyl (meth) acrylate, etc.); sulfoalkyl (meth)acrylates (e.g., sodium sulfohexyl (meth)acrylate); glycidyl (meth)acrylates (e.g., glycidyl (meth)acrylate, methylglycidyl (meth)acrylate, etc.); (meth)acrylate silane compounds (e.g., methacryloxypropyltrimethoxysilane, 3-(meth)acryloxypropylmethyl-dimethoxysilane, 3-(meth)acryloxypropyl-dimethylmethoxysilane, 3-(meth)acryloxypropyl-dimethylethoxysilane, 3-(meth)acryloxypropyl-triethoxysilane, etc.; and so forth.

Upon polymerization, the resulting conductive polymer complex is generally in the form of particles having a small size, such as an average size (e.g., diameter) of from about 1 to about 100 nanometers, in some embodiments from about 2 to about 80 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

If desired, polymerization of the monomer may occur in a precursor solution so that the resulting particles are in the form of a dispersion. Solvents (e.g., polar protic or nonpolar) may be employed in the solution, such as water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. Water is a particularly suitable solvent for the reaction. When employed, the total amount of solvents in the precursor solution may be from about 40 wt. % wt. % to about 90 wt. %, in some embodiments from about 50 wt. % to about 85 wt. %, and in some embodiments, from about 60 wt. % to about 80 wt. %. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion. Polymerization of the thiophene monomer may occur at a temperature of from about 10° C. to about 100° C., and in some embodiments, from about 15° C. to about 75° C. Upon completion of the reaction, known filtration techniques may be employed to remove any salt impurities. One or more washing steps may also be employed to purify the dispersion.

In addition to thiophene polymer(s) and the copolymer counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyam ides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-am inopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied by to the part using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and washed.

i. Inner Layers

The solid electrolyte is generally formed from one or more "inner" conductive polymer layers. The term "inner" in this context refers to one or more layers formed from the same material and that overly the dielectric, whether directly or via another layer (e.g., adhesive layer). The inner layer(s), for example, typically contain conductive polymer particles such as described above. In one particular embodiment, the inner layer(s) are generally free of conventional polymeric counterions, such as polystyrene sulfonic acid. One or multiple inner layers may be employed. For example, the solid electrolyte typically contains from 2 to 30, in some embodiments from 4 to 20, and in some embodiments, from about 5 to 15 inner layers (e.g., 10 layers). The particles of the inner layer(s) may have an average size (e.g., diameter) of from about 1 to about 100 nanometers, in some embodiments from about 2 to about 80 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

ii. Outer Layers

The solid electrolyte may contain only "inner layers" so that it is essentially formed from the same material. Nevertheless, in other embodiments, the solid electrolyte may also contain one or more optional "outer" conductive polymer layers that are formed from a different material than the inner layer(s) and overly the inner layer(s). One or multiple outer layers may be employed. For example, the solid electrolyte may contain from 2 to 30, in some embodiments from 4 to 20, and in some embodiments, from about 5 to 15 outer layers. Such layers may, for example, be formed from a dispersion of conductive polymer particles that includes a thiophene polymer and a homopolymer counterion, such as a polyacrylic acid, polymethacrylic acid, polymaleic acid, polystyrene sulfonic acids ("PSS"), polyvinyl sulfonic acid, etc. The particles of the outer layer(s) may have a size similar to those employed in the inner layer(s), or in some cases, greater than the size of the particles employed in the inner layer(s). For example, the particles of the outer layer(s) may have an average size (e.g., diameter) of from about 1 to about 100 nanometers, in some embodiments from about 2 to about 80 nanometers, and in some embodiments, from about 4 to about 50 nanometers.

If desired, a hydroxyl-functional nonionic polymer may also be employed in the outer layer(s) of the solid electrolyte. The term "hydroxy-functional" generally means that the compound contains at least one hydroxyl functional group or is capable of possessing such a functional group in the presence of a solvent. Without intending to be limited by theory, it is believed that the use of a hydroxy-functional polymer with a certain molecular weight can minimize the likelihood of chemical decomposition at high voltages. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—$OH$ (e.g., octaethylene glycol monododecyl ether and pentaethylene glycol monododecyl ether); polyoxypropylene glycol alkyl ethers having the general formula: $CH_3$—$(CH_2)_{10\text{-}16}$—$(O$—$C_3H_6)_{1\text{-}25}$—$OH$; polyoxyethylene glycol octylphenol ethers having the following general formula: $C_8H_{17}$—$(C_6H_4)$—$(O$—$C_2H_4)_{1\text{-}25}$—$OH$ (e.g., Triton™ X-100); polyoxyethylene glycol alkylphenol ethers having the following general formula: $C_9H_{19}$—$(C_6H_4)$—$(O$—$C_2H_4)_{1\text{-}25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

The hydroxy-functional nonionic polymer may be incorporated into the outer layers in a variety of different ways. In certain embodiments, for instance, the nonionic polymer may simply be incorporated into the dispersion of extrinsically conductive polymers. In such embodiments, the concentration of the nonionic polymer in the layer may be from about 1 wt. % to about 50 wt. %, in some embodiments from about 5 wt. % to about 40 wt. %, and in some embodiments, from about 10 wt. % to about 30 wt. %. In other embodiments, however, the nonionic polymer may be applied after the initial outer layer(s) are formed. In such embodiments, the technique used to apply the nonionic polymer may vary. For example, the nonionic polymer may be applied in the form of a liquid solution using various methods, such as immersion, dipping, pouring, dripping, injection, spraying, spreading, painting or printing, for example, inkjet, screen printing or tampon printing. Solvents known to the person skilled in the art can be employed in the solution, such as water, alcohols, or a mixture thereof. The concentration of the nonionic polymer in such a solution typically ranges from about 5 wt. % to about 95 wt. %, in some embodiments from about 10 wt. % to about 70 wt. %, and in some embodiments, from about 15 wt. % to about 50 wt. % of the solution. If desired, such solutions may be generally free of conductive polymers. For example, conductive polymers may constitute about 2 wt. % or less, in some embodiments about 1 wt. % or less, and in some embodiments, about 0.5 wt. % or less of the solution.

D. External Polymer Coating

As indicated above, an external polymer coating is also applied to the anode that overlies the solid electrolyte. The external polymer coating generally contains one or more layers formed from conductive polymer particles, such as described above (e.g., formed from a thiophene polymer/copolymer counterion complex) and/or other types of conductive polymer particles (e.g., formed from a thiophene polymer and a homopolymer counterion, such as polystyrene sulfonic acid). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in any optional dispersions of the solid electrolyte. For example, the ratio of the average size of the particles employed in the external polymer coating to the average size of the particles employed in the solid electrolyte is typically from about 1.5 to about 30, in some embodiments from about 2 to about 20, and in some embodiments, from about 5 to about 15. For example, the particles employed in the external coating may have an average size of from about 50 to about 800 nanometers, in some embodiments from about 80 to about 600 nanometers, and in some embodiments, from about 100 to about 500 nanometers.

A crosslinking agent may also be optionally employed in the external polymer coating to further enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 µm, in some embodiments from about 2 to about 40 µm, and in some embodiments, from about 5 to about 20 µm.

E. Cathode Coating

If desired, the capacitor element may also employ a cathode coating that overlies the solid electrolyte (e.g., external polymer coating). The cathode coating may contain a metal particle layer includes a plurality of conductive metal particles dispersed within a polymer matrix. The particles typically constitute from about 50 wt. % to about 99 wt. %, in some embodiments from about 60 wt. % to about 98 wt. %, and in some embodiments, from about 70 wt. % to about 95 wt. % of the layer, while the polymer matrix typically constitutes from about 1 wt. % to about 50 wt. %, in some embodiments from about 2 wt. % to about 40 wt. %, and in some embodiments, from about 5 wt. % to about 30 wt. % of the layer.

The conductive metal particles may be formed from a variety of different metals, such as copper, nickel, silver, nickel, zinc, tin, lead, copper, aluminum, molybdenum, titanium, iron, zirconium, magnesium, etc., as well as alloys thereof. Silver is a particularly suitable conductive metal for use in the layer. The metal particles often have a relatively small size, such as an average size of from about 0.01 to about 50 micrometers, in some embodiments from about 0.1 to about 40 micrometers, and in some embodiments, from about 1 to about 30 micrometers. Typically, only one metal particle layer is employed, although it should be understood that multiple layers may be employed if so desired. The total thickness of such layer(s) is typically within the range of from about 1 μm to about 500 μm, in some embodiments from about 5 μm to about 200 μm, and in some embodiments, from about 10 μm to about 100 μm.

The polymer matrix typically includes a polymer, which may be thermoplastic or thermosetting in nature. Typically, however, the polymer is selected so that it can act as a barrier to electromigration of silver ions, and also so that it contains a relatively small amount of polar groups to minimize the degree of water adsorption in the cathode coating. In this regard, the present inventors have found that vinyl acetal polymers are particularly suitable for this purpose, such as polyvinyl butyral, polyvinyl formal, etc. Polyvinyl butyral, for instance, may be formed by reacting polyvinyl alcohol with an aldehyde (e.g., butyraldehyde). Because this reaction is not typically complete, polyvinyl butyral will generally have a residual hydroxyl content. By minimizing this content, however, the polymer can possess a lesser degree of strong polar groups, which would otherwise result in a high degree of moisture adsorption and result in silver ion migration. For instance, the residual hydroxyl content in polyvinyl acetal may be about 35 mol. % or less, in some embodiments about 30 mol. % or less, and in some embodiments, from about 10 mol. % to about 25 mol. %. One commercially available example of such a polymer is available from Sekisui Chemical Co., Ltd. under the designation "BH-S" (polyvinyl butyral).

To form the cathode coating, a conductive paste is typically applied to the capacitor that overlies the solid electrolyte. One or more organic solvents are generally employed in the paste. A variety of different organic solvents may generally be employed, such as glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., benzyl alcohol, methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); etc., as well as mixtures thereof. The organic solvent(s) typically constitute from about 10 wt. % to about 70 wt. %, in some embodiments from about 20 wt. % to about 65 wt. %, and in some embodiments, from about 30 wt. % to about 60 wt. %. of the paste. Typically, the metal particles constitute from about 10 wt. % to about 60 wt. %, in some embodiments from about 20 wt. % to about 45 wt. %, and in some embodiments, from about 25 wt. % to about 40 wt. % of the paste, and the resinous matrix constitutes from about 0.1 wt. % to about 20 wt. %, in some embodiments from about 0.2 wt. % to about 10 wt. %, and in some embodiments, from about 0.5 wt. % to about 8 wt. % of the paste.

The paste may have a relatively low viscosity, allowing it to be readily handled and applied to a capacitor element. The viscosity may, for instance, range from about 50 to about 3,000 centipoise, in some embodiments from about 100 to about 2,000 centipoise, and in some embodiments, from about 200 to about 1,000 centipoise, such as measured with a Brookfield DV-1 viscometer (cone and plate) operating at a speed of 10 rpm and a temperature of 25° C. If desired, thickeners or other viscosity modifiers may be employed in the paste to increase or decrease viscosity. Further, the thickness of the applied paste may also be relatively thin and still achieve the desired properties. For example, the thickness of the paste may be from about 0.01 to about 50 micrometers, in some embodiments from about 0.5 to about 30 micrometers, and in some embodiments, from about 1 to about 25 micrometers. Once applied, the metal paste may be optionally dried to remove certain components, such as the organic solvents. For instance, drying may occur at a temperature of from about 20° C. to about 150° C., in some embodiments from about 50° C. to about 140° C., and in some embodiments, from about 80° C. to about 130° C.

F. Other Components

If desired, the capacitor may also contain other layers as is known in the art. In certain embodiments, for instance, a carbon layer (e.g., graphite) may be positioned between the solid electrolyte and the silver layer that can help further limit contact of the silver layer with the solid electrolyte. In addition, a pre-coat layer may also be employed that overlies the dielectric and includes an organometallic compound.

II. Terminations

Once formed, the capacitor element may be provided with terminations, particularly when employed in surface mounting applications. For example, the capacitor may contain an anode termination to which an anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor element using any technique known in the art. In one embodiment, for example, a lead frame may be provided that defines the cathode termination and anode termination. To attach the electrolytic capacitor element to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor element is adequately adhered to the cathode termination.

III. Housing

The capacitor element may be incorporated within a housing in various ways. In certain embodiments, for instance, the capacitor element may be enclosed within a case, which may then be filled with a resinous material, such as a thermoset resin (e.g., epoxy resin) that can be cured to form a hardened housing. The resinous material may surround and encapsulate the capacitor element so that at least a portion of the anode and cathode terminations are exposed for mounting onto a circuit board. When encapsulated in this manner, the capacitor element and resinous material form an integral capacitor.

Of course, in alternative embodiments, it may be desirable to enclose the capacitor element within a housing that remains separate and distinct. In this manner, the atmosphere of the housing can be selectively controlled so that it is dry, which limits the degree of moisture that can contact the capacitor element. For example, the moisture content of the atmosphere (expressed in terms of relative humidity) may be about 10% or less, in some embodiments about 5% or less, in some embodiments about 3% or less, and in some embodiments, from about 0.001 to about 1%. For example, the atmosphere may be gaseous and contain at least one inert gas, such as nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing.

Any of a variety of different materials may be used to form the housing, such as metals, plastics, ceramics, and so forth. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housing may include one or more layers of a ceramic material, such as aluminum nitride, aluminum oxide, silicon oxide, magnesium oxide, calcium oxide, glass, etc., as well as combinations thereof.

The housing may have any desired shape, such as cylindrical, D-shaped, rectangular, triangular, prismatic, etc. Referring to FIG. 1, for example, one embodiment of a capacitor 100 is shown that contains a housing 122 and a capacitor element 120. In this particular embodiment, the housing 122 is generally rectangular. Typically, the housing and the capacitor element have the same or similar shape so that the capacitor element can be readily accommodated within the interior cavity. In the illustrated embodiment, for example, both the capacitor element 120 and the housing 122 have a generally rectangular shape.

If desired, the capacitor of the present invention may exhibit a relatively high volumetric efficiency. To facilitate such high efficiency, the capacitor element typically occupies a substantial portion of the volume of an interior cavity of the housing. For example, the capacitor element may occupy about 30 vol. % or more, in some embodiments about 50 vol. % or more, in some embodiments about 60 vol. % or more, in some embodiments about 70 vol. % or more, in some embodiments from about 80 vol. % to about 98 vol. %, and in some embodiments, from about 85 vol. % to 97 vol. % of the interior cavity of the housing. To this end, the difference between the dimensions of the capacitor element and those of the interior cavity defined by the housing are typically relatively small.

Referring to FIG. 1, for example, the capacitor element 120 may have a length (excluding the length of the anode lead 6) that is relatively similar to the length of an interior cavity 126 defined by the housing 122. For example, the ratio of the length of the anode to the length of the interior cavity ranges from about 0.40 to 1.00, in some embodiments from about 0.50 to about 0.99, in some embodiments from about 0.60 to about 0.99, and in some embodiments, from about 0.70 to about 0.98. The capacitor element 120 may have a length of from about 5 to about 10 millimeters, and the interior cavity 126 may have a length of from about 6 to about 15 millimeters. Similarly, the ratio of the height of the capacitor element 120 (in the −z direction) to the height of the interior cavity 126 may range from about 0.40 to 1.00, in some embodiments from about 0.50 to about 0.99, in some embodiments from about 0.60 to about 0.99, and in some embodiments, from about 0.70 to about 0.98. The ratio of the width of the capacitor element 120 (in the −x direction) to the width of the interior cavity 126 may also range from about 0.50 to 1.00, in some embodiments from about 0.60 to about 0.99, in some embodiments from about 0.70 to about 0.99, in some embodiments from about 0.80 to about 0.98, and in some embodiments, from about 0.85 to about 0.95. For example, the width of the capacitor element 120 may be from about 2 to about 7 millimeters and the width of the interior cavity 126 may be from about 3 to about 10 millimeters, and the height of the capacitor element 120 may be from about 0.5 to about 2 millimeters and the width of the interior cavity 126 may be from about 0.7 to about 6 millimeters.

Although by no means required, the capacitor element may be attached to the housing in such a manner that an anode termination and cathode termination are formed external to the housing for subsequent integration into a circuit. The particular configuration of the terminations may depend on the intended application. In one embodiment, for example, the capacitor may be formed so that it is surface mountable, and yet still mechanically robust. For example, the anode lead may be electrically connected to external, surface mountable anode and cathode terminations (e.g., pads, sheets, plates, frames, etc.). Such terminations may extend through the housing to connect with the capacitor. The thickness or height of the terminations is generally selected to minimize the thickness of the capacitor. For instance, the thickness of the terminations may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

In certain embodiments, connective members may be employed within the interior cavity of the housing to facilitate connection to the terminations in a mechanically stable manner. For example, referring again to FIG. 1, the capacitor 100 may include a connection member 162 that is formed from a first portion 167 and a second portion 165. The connection member 162 may be formed from conductive materials similar to the external terminations. The first portion 167 and second portion 165 may be integral or separate pieces that are connected together, either directly or via an additional conductive element (e.g., metal). In the illustrated embodiment, the second portion 165 is provided in a plane that is generally parallel to a lateral direction in which the lead 6 extends (e.g., −y direction). The first portion 167 is "upstanding" in the sense that it is provided in a plane that is generally perpendicular the lateral direction in which the lead 6 extends. In this manner, the first portion 167 can limit movement of the lead 6 in the horizontal direction to enhance surface contact and mechanical stability during use. If desired, an insulative material 7 (e.g., Teflon™ washer) may be employed around the lead 6.

The first portion 167 may possess a mounting region (not shown) that is connected to the anode lead 6. The region may have a "U-shape" for further enhancing surface contact and mechanical stability of the lead 6. Connection of the region to the lead 6 may be accomplished using any of a variety of known techniques, such as welding, laser welding, conductive adhesives, etc. In one particular embodiment, for example, the region is laser welded to the anode lead 6. Regardless of the technique chosen, however, the first portion 167 can hold the anode lead 6 in substantial horizontal alignment to further enhance the dimensional stability of the capacitor 100.

Referring again to FIG. 1, one embodiment of the present invention is shown in which the connective member 162 and capacitor element 120 are connected to the housing 122 through anode and cathode terminations 127 and 129, respectively. More specifically, the housing 122 of this embodiment includes an outer wall 123 and two opposing sidewalls 124 between which a cavity 126 is formed that includes the capacitor element 120. The outer wall 123 and sidewalls 124 may be formed from one or more layers of a metal, plastic, or ceramic material such as described above. In this particular embodiment, the anode termination 127 contains a first region 127a that is positioned within the housing 122 and electrically connected to the connection member 162 and a second region 127b that is positioned external to the housing 122 and provides a mounting surface 201. Likewise, the cathode termination 129 contains a first region 129a that is positioned within the housing 122 and electrically connected to the solid electrolyte of the capacitor element 120 and a second region 129b that is positioned external to the housing 122 and provides a mounting surface 203. It should be understood that the entire portion of such regions need not be positioned within or external to the housing.

In the illustrated embodiment, a conductive trace 127c extends in the outer wall 123 of the housing to connect the first region 127a and second region 127b. Similarly, a conductive trace 129c extends in the outer wall 123 of the housing to connect the first region 127a and second region 127b. The conductive traces and/or regions of the terminations may be separate or integral. In addition to extending through the outer wall of the housing, the traces may also be positioned at other locations, such as external to the outer wall. Of course, the present invention is by no means limited to the use of conductive traces for forming the desired terminations.

Regardless of the particular configuration employed, connection of the terminations 127 and 129 to the capacitor element 120 may be made using any known technique, such as welding, laser welding, conductive adhesives, etc. In one particular embodiment, for example, a conductive adhesive 131 is used to connect the second portion 165 of the connection member 162 to the anode termination 127. Likewise, a conductive adhesive 133 is used to connect the cathode of the capacitor element 120 to the cathode termination 129.

Optionally, a polymeric restraint may also be disposed in contact with one or more surfaces of the capacitor element, such as the rear surface, front surface, upper surface, lower surface, side surface(s), or any combination thereof. The polymeric restraint can reduce the likelihood of delamination by the capacitor element from the housing. In this regard, the polymeric restraint may possesses a certain degree of strength that allows it to retain the capacitor element in a relatively fixed positioned even when it is subjected to vibrational forces, yet is not so strong that it cracks. For example, the restraint may possess a tensile strength of from about 1 to about 150 Megapascals ("MPa"), in some embodiments from about 2 to about 100 MPa, in some embodiments from about 10 to about 80 MPa, and in some embodiments, from about 20 to about 70 MPa, measured at a temperature of about 25° C. It is normally desired that the restraint is not electrically conductive. Referring again to FIG. 1, for instance, one embodiment is shown in which a single polymeric restraint 197 is disposed in contact with an upper surface 181 and rear surface 177 of the capacitor element 120. While a single restraint is shown in FIG. 1, it should be understood that separate restraints may be employed to accomplish the same function. In fact, more generally, any number of polymeric restraints may be employed to contact any desired surface of the capacitor element. When multiple restraints are employed, they may be in contact with each other or remain physically separated. For example, in one embodiment, a second polymeric restraint (not shown) may be employed that contacts the upper surface 181 and front surface 179 of the capacitor element 120. The first polymeric restraint 197 and the second polymeric restraint (not shown) may or may not be in contact with each other. In yet another embodiment, a polymeric restraint may also contact a lower surface 183 and/or side surface(s) of the capacitor element 120, either in conjunction with or in lieu of other surfaces.

Regardless of how it is applied, it is typically desired that the polymeric restraint is also in contact with at least one surface of the housing to help further mechanically stabilize the capacitor element against possible delamination. For example, the restraint may be in contact with an interior surface of one or more sidewall(s), outer wall, lid, etc. In FIG. 1, for example, the polymeric restraint 197 is in contact with an interior surface 107 of sidewall 124 and an interior surface 109 of outer wall 123. While in contact with the housing, it is nevertheless desired that at least a portion of the cavity defined by the housing remains unoccupied to allow for the inert gas to flow through the cavity and limit contact of the solid electrolyte with oxygen. For example, at least about 5% of the cavity volume typically remains unoccupied by the capacitor element and polymer restraint, and in some embodiments, from about 10% to about 50% of the cavity volume.

Once connected in the desired manner, the resulting package is hermetically sealed as described above. Referring again to FIG. 1, for instance, the housing 122 may also include a lid 125 that is placed on an upper surface of side walls 124 after the capacitor element 120 and the polymer restraint 197 are positioned within the housing 122. The lid 125 may be formed from a ceramic, metal (e.g., iron, copper, nickel, cobalt, etc., as well as alloys thereof), plastic, and so forth. If desired, a sealing member 187 may be disposed between the lid 125 and the side walls 124 to help provide a good seal. In one embodiment, for example, the sealing member may include a glass-to-metal seal, Kovar® ring (Goodfellow Camridge, Ltd.), etc. The height of the side walls 124 is generally such that the lid 125 does not contact any surface of the capacitor element 120 so that it is not contaminated. The polymeric restraint 197 may or may not contact the lid 125. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Figure 2:
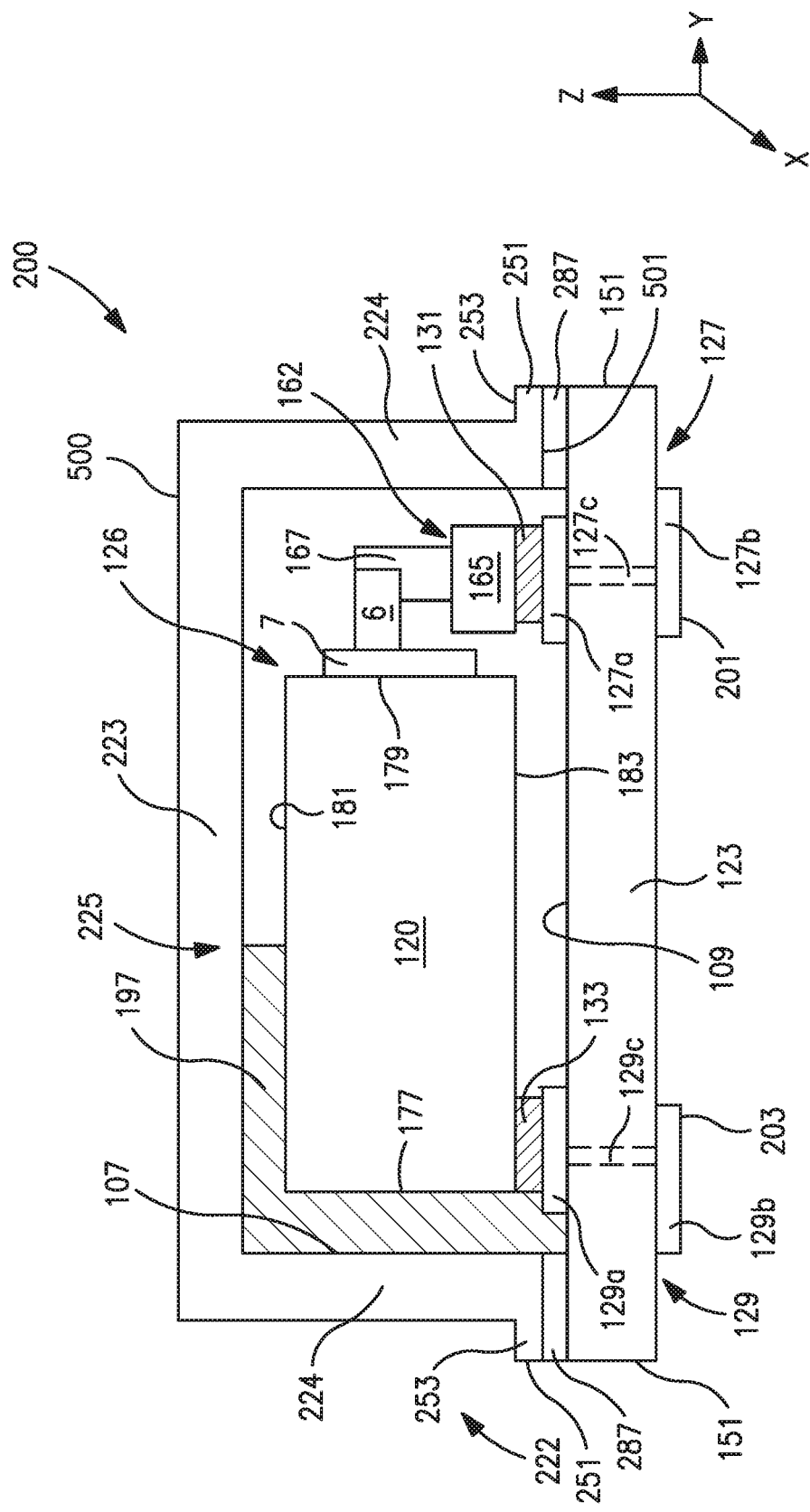
FIG. 2 is a cross-sectional view of another embodiment of a capacitor of the assembly of the present invention.

It should be understood that the embodiments described are only exemplary, and that various other configurations may be employed in the present invention for hermetically sealing a capacitor element within a housing. Referring to FIG. 2, for instance, another embodiment of a capacitor 200 is shown that employs a housing 222 that includes an outer wall 123 and a lid 225 between which a cavity 126 is formed that includes the capacitor element 120 and polymeric restraint 197. The lid 225 includes an outer wall 223 that is integral with at least one sidewall 224. In the illustrated embodiment, for example, two opposing sidewalls 224 are shown in cross-section. The outer walls 223 and 123 both extend in a lateral direction (—y direction) and are generally parallel with each other and to the lateral direction of the anode lead 6. The sidewall 224 extends from the outer wall 223 in a longitudinal direction that is generally perpendicular to the outer wall 123. A distal end 500 of the lid 225 is defined by the outer wall 223 and a proximal end 501 is defined by a lip 253 of the sidewall 224.

The lip 253 extends from the sidewall 224 in the lateral direction, which may be generally parallel to the lateral direction of the outer wall 123. The angle between the sidewall 224 and the lip 253 may vary, but is typically from about 60° to about 120°, in some embodiments from about 70° to about 110°, and in some embodiments, from about 80° to about 100° (e.g., about 90°). The lip 253 also defines a peripheral edge 251, which may be generally perpendicular to the lateral direction in which the lip 253 and outer wall 123 extend. The peripheral edge 251 is located beyond the outer periphery of the sidewall 224 and may be generally coplanar with an edge 151 of the outer wall 123. The lip 253 may be sealed to the outer wall 123 using any known technique, such as welding (e.g., resistance or laser), soldering, glue, etc. For example, in the illustrated embodiment, a sealing member 287 is employed (e.g., glass-to-metal seal, Kovar® ring, etc.) between the components to facilitate their attachment. Regardless, the use of a lip described above can enable a more stable connection between the components and improve the seal and mechanical stability of the capacitor.

Figure 3:
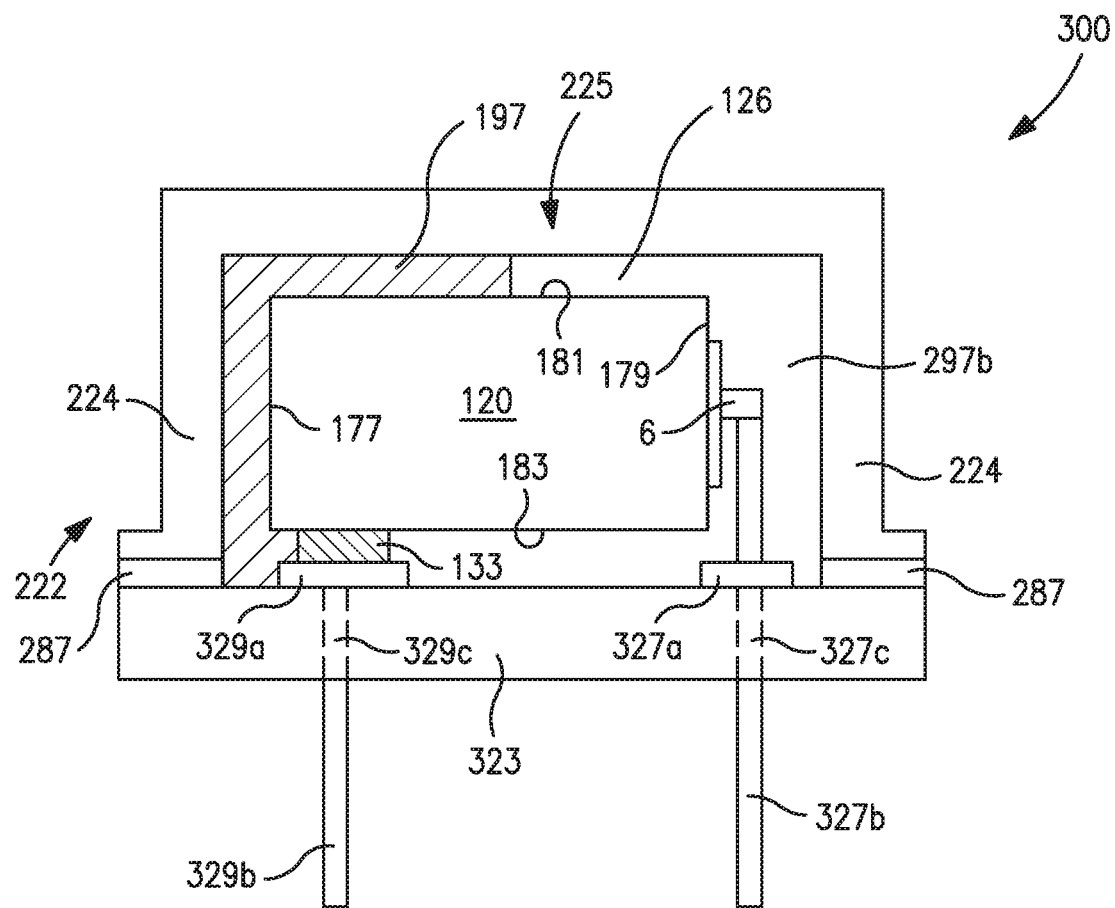
FIG. 3 is a cross-sectional view of yet another embodiment of a capacitor of the assembly of the present invention.

Still other possible housing configurations may be employed in the present invention. For example, FIG. 3 shows a capacitor 300 having a housing configuration similar to that of FIG. 2, except that terminal pins 327b and 329b are employed as the external terminations for the anode and cathode, respectively. More particularly, the terminal pin 327a extends through a trace 327c formed in the outer wall 323 and is connected to the anode lead 6 using known techniques (e.g., welding). An additional section 327a may be employed to secure the pin 327b. Likewise, the terminal pin 329b extends through a trace 329c formed in the outer wall 323 and is connected to the cathode via a conductive adhesive 133 as described above.

Figure 4:
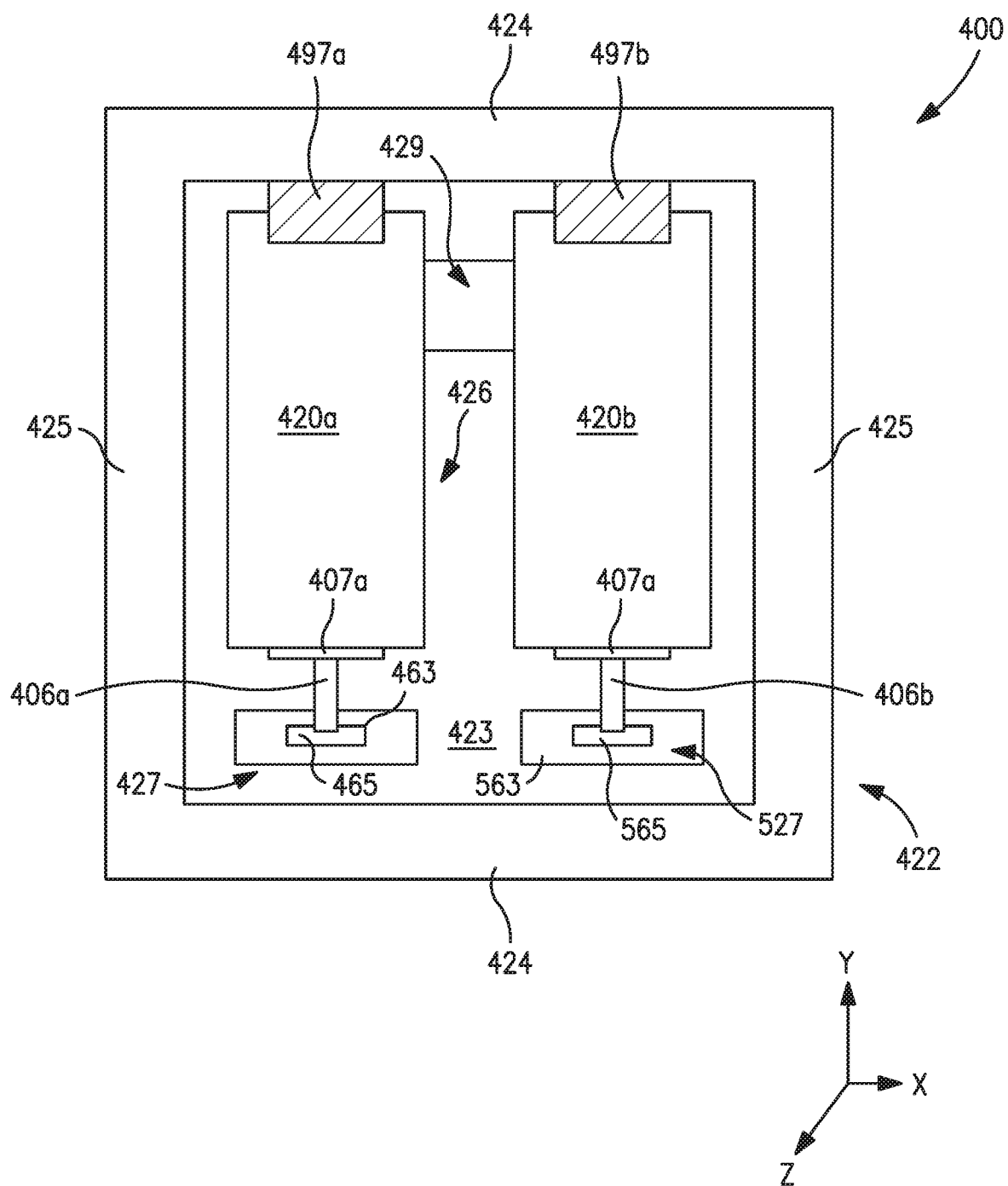
FIG. 4 is a top view of still another embodiment of a capacitor of the assembly of the present invention.

The embodiments shown in FIGS. 1-3 are discussed herein in terms of only a single capacitor element. It should also be understood, however, that multiple capacitor elements may also be hermetically sealed within a housing. The multiple capacitor elements may be attached to the housing using any of a variety of different techniques. Referring to FIG. 4, for example one particular embodiment of a capacitor 400 that contains two capacitor elements is shown and will now be described in more detail. More particularly, the capacitor 400 includes a first capacitor element 420a in electrical communication with a second capacitor element 420b. In this embodiment, the capacitor elements are aligned so that their major surfaces are in a horizontal configuration. That is, a major surface of the capacitor element 420a defined by its width (-x direction) and length (-y direction) is positioned adjacent to a corresponding major surface of the capacitor element 420b. Thus, the major surfaces are generally coplanar. Alternatively, the capacitor elements may be arranged so that their major surfaces are not coplanar, but perpendicular to each other in a certain direction, such as the -z direction or the -x direction. Of course, the capacitor elements need not extend in the same direction.

The capacitor elements 420a and 420b are positioned within a housing 422 that contains an outer wall 423 and sidewalls 424 and 425 that together define a cavity 426. Although not shown, a lid may be employed that covers the upper surfaces of the sidewalls 424 and 425 and seals the assembly 400 as described above. Optionally, a polymeric restraint may also be employed to help limit the vibration of the capacitor elements. In FIG. 4, for example, separate polymer restraints 497a and 497b are positioned adjacent to and in contact with the capacitor elements 420a and 420b, respectively. The polymer restraints 497a and 497b may be positioned in a variety of different locations. Further, one of the restraints may be eliminated, or additional restraints may be employed. In certain embodiments, for example, it may be desired to employ a polymeric restraint between the capacitor elements to further improve mechanical stability.

In addition to the capacitor elements, the capacitor also contains an anode termination to which anode leads of respective capacitor elements are electrically connected and a cathode termination to which the cathodes of respective capacitor elements are electrically connected. Referring again to FIG. 4, for example, the capacitor elements are shown connected in parallel to a common cathode termination 429. In this particular embodiment, the cathode termination 429 is initially provided in a plane that is generally parallel to the bottom surface of the capacitor elements and may be in electrical contact with conductive traces (not shown). The capacitor 400 also includes connective members 427 and 527 that are connected to anode leads 407a and 407b, respectively, of the capacitor elements 420a and 420b. More particularly, the connective member 427 contains an upstanding portion 465 and a planar portion 463 that is in connection with an anode termination (not shown). Likewise, the connective 527 contains an upstanding portion 565 and a planar portion 563 that is in connection with an anode termination (not shown). Of course, it should be understood that a wide variety of other types of connection mechanisms may also be employed.

The present invention may be better understood by reference to the following examples.

Test Procedures

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature may be 23° C.±2° C. To measure "dry capacitance", test parts are submitted to drying at an elevated temperature of 125° C. for 12 hours. The capacitance measurement is performed after a recovery time period of 25 to 35 minutes. To measure "wet capacitance", test parts are submitted to a relative humidity level of 85% at an elevated temperature of 85° C. for 48 hours. The capacitance measurement is performed after a recovery time period of 25 to 35 minutes.

Breakdown Voltage

The breakdown voltage was measured using Keithley 2400 SourceMeter at the temperature 23° C.±2° C. An individual capacitor is charged with constant current determined by the equation:

Current $(A)$=Nominal Capacitance $(F)$×dU/dt, where dU/dt represents voltage slope typically set to 10 V/s. Voltage is measured during charging and when applied voltage decreases more than 10%, the maximum achieved voltage value is recorded as breakdown voltage.

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Dissipation Factor

The dissipation factor may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Leakage Current

Leakage current may be measured using a leakage test meter at a temperature of 23° C.±2° C. and at the rated voltage after a minimum of 60 seconds.

EXAMPLE 1

23,000 μFV/g tantalum powder was used to form anode samples. Each anode sample was embedded with a tantalum wire, sintered at 1550° C., and pressed to a density of 5.3 g/cm³. The resulting pellets had a size of 1.15×1.10×0.60 mm. The pellets were anodized to 77.0 volts in water/phosphoric acid electrolyte with a conductivity of 8.6 mS at a temperature of 85° C. to form the dielectric layer. A conductive polymer coating was then formed by dipping the anodes into a dispersed poly(3,4-ethylenedioxythiophene) having a solids content 1.1% and viscosity 20 mPa·s (Clevios™ K, Heraeus). Upon coating, the parts were dried at 125° C. for 15 minutes. This process was repeated 10 times. Thereafter, the parts were dipped into a dispersed poly(3,4-ethylenedioxythiophene) having a solids content 2.0% and viscosity 20 mPa·s (Clevios™ K, Heraeus). Upon coating, the parts were dried at 125° C. for 15 minutes. This process was repeated 3 times. Thereafter, the parts were dipped into a dispersed poly(3,4-ethylenedioxythiophene) having a solids content of 2% and viscosity 160 mPa·s (Clevios™ K, Heraeus). Upon coating, the parts were dried at 125° C. for 15 minutes. This process was repeated 14 times. The parts were then dipped into a graphite dispersion and dried. Finally, the parts were dipped into a silver dispersion and dried. Multiple parts (100) of 1 μF/35V capacitors were made in this manner and encapsulated in a silica resin.

EXAMPLE 2

Capacitors were formed in the manner described in Example 1, except that a different conductive polymer coating was used. The conductive polymer coating was formed by dipping the anodes into a dispersed poly(3,4-ethylenedioxythiophene) with a copolymer counterion as described herein. Upon coating, the parts were dried at 150° C. for 15 minutes. This process was repeated 10 times. Thereafter, the parts were dipped into a dispersed poly(3,4-ethylenedioxythiophene) having a solids content of 2.0% and viscosity 20 mPa·s (Clevios™ K, Heraeus). Upon coating, the parts were dried at 125° C. for 15 minutes. This process was repeated 3 times. Thereafter, the parts were dipped into a dispersed poly(3,4-ethylenedioxythiophene) having a solids content of 2% and viscosity 160 mPa·s (Clevios™ K, Heraeus). Upon coating, the parts were dried at 125° C. for 15 minutes. This process was repeated 14 times. The parts were then dipped into a graphite dispersion and dried. Finally, the parts were dipped into a silver dispersion and dried. Multiple parts (200) of 1 μF/35V capacitors were made in this manner and encapsulated in a silica resin.

The average results of breakdown voltage, dry and wet capacitance and calculated value of capacitance recovery are set forth below in Table 1.

TABLE 1

| | Capacitance and Breakdown Voltage | | | | |
|---|---|---|---|---|---|
| | Sample Size | Dry Capacitance (uF) | Wet Capacitance (uF) | Recovery (%) | Breakdown voltage (V) |
| Example 1 | 10 | 0.91 | 1.20 | 75.6 | 102.2 |
| Example 2 | 10 | 1.05 | 1.20 | 87.5 | 105.2 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising a capacitor element that contains:
   a sintered porous anode body;
   a dielectric that overlies the anode body;
   a solid electrolyte that overlies the dielectric, wherein the solid electrolyte includes conductive polymer particles that contain a complex formed from a thiophene polymer and a copolymer counterion, wherein the copolymer counterion contains a first repeating unit derived from a sulfonic acid monomer and a second repeating unit derived from a (meth)acrylate monomer, and wherein the weight ratio of the sulfonic acid monomer to the (meth)acrylate monomer is from about 0.5:1 to about 30:1; and an external polymer coating that overlies the solid electrolyte and includes conductive polymer particles.

2. The solid electrolytic capacitor of claim 1, wherein the thiophene polymer contains repeating units having the following general formula (I):

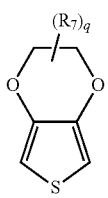

(I)

wherein,
R$_7$ is a linear or branched, C$_1$ to C$_{18}$ alkyl radical; C$_5$ to C$_{12}$ cycloalkyl radical; C$_6$ to C$_{14}$ aryl radical; or C$_7$ to C$_{18}$ aralkyl radical; and
q is an integer from 0 to 8.

3. The solid electrolytic capacitor of claim 2, wherein q is 0.

4. The solid electrolytic capacitor of claim 1, wherein the first repeating unit is derived from a C$_1$ to C$_{20}$ alkane sulfonic acid, aliphatic perfluorosulfonic acid, aromatic sulfonic acid, or a combination thereof.

5. The solid electrolytic capacitor of claim 4, wherein the first repeating unit is derived from styrene sulfonic acid.

6. The solid electrolytic capacitor of claim 1, wherein the second repeating unit is derived from an alkyl (meth)acrylate, cycloalkyl (meth)acrylate, alkylamino (meth)acrylate, hydroxyalkyl (meth)acrylate, sulfoalkyl (meth)acrylate, glycidyl (meth)acrylate, (meth)acrylate silane compound, or a combination thereof.

7. The solid electrolytic capacitor of claim 1, wherein the weight ratio of the sulfonic acid monomer to the (meth)acrylate monomer is from about 1:1 to about 25:1.

8. The solid electrolytic capacitor of claim 1, wherein the weight ratio of the copolymer counterion to the thiophene polymer is from about 0.5:1 to about 50:1.

9. The solid electrolytic capacitor of claim 1, wherein the conductive polymer particles of the solid electrolyte have an average size of from about 1 to about 100 nanometers.

10. The solid electrolytic capacitor of claim 1, wherein the solid electrolyte contains at least one inner layer formed from conductive polymer particles that contain a complex formed from a thiophene polymer and a copolymer counterion.

11. The solid electrolytic capacitor of claim 10, wherein the solid electrolyte contains from 5 to 15 inner layers.

12. The solid electrolytic capacitor of claim 11, wherein the solid electrolyte contains at least one outer layer.

13. The solid electrolytic capacitor of claim 12, wherein the outer layer is formed from conductive polymer particles that contain a complex formed from a thiophene polymer and a copolymer counterion.

14. The solid electrolytic capacitor of claim 12, wherein the outer layer is formed from conductive polymer particles that contain a complex formed from a thiophene polymer and a polystyrene sulfonic acid counterion.

15. The solid electrolytic capacitor of claim 12, wherein the outer layer further contains a hydroxyl-functional nonionic polymer.

16. The solid electrolytic capacitor of claim 1, wherein the conductive polymer particles of the external polymer coating contain a complex formed from a thiophene polymer and a copolymer counterion.

17. The solid electrolytic capacitor of claim 1, wherein the conductive polymer particles of the external polymer coating contain a complex formed from a thiophene polymer and a polystyrene sulfonic acid counterion.

18. The solid electrolytic capacitor of claim 1, wherein the external polymer coating further comprises a crosslinking agent.

19. The solid electrolytic capacitor of claim 1, wherein the ratio of the average size of the particles employed in the external polymer coating to the average size of the particles employed in the solid electrolyte is from about 1.5 to about 30.

20. The solid electrolytic capacitor of claim 1, wherein the conductive polymer particles of the solid electrolyte have an average size of from about 1 to about 80 nanometers and the conductive polymer particles of the external coating have an average size of from about 80 to about 600 nanometers.

21. The solid electrolytic capacitor of claim 1, further comprising an anode lead extending from the capacitor element.

22. The solid electrolytic capacitor of claim 21, further comprising an anode termination that is in electrical contact with the anode lead and a cathode termination that is in electrical connection with the solid electrolyte.

23. The solid electrolytic capacitor of claim 1, further comprising a housing within which the capacitor element is enclosed.

24. The solid electrolytic capacitor of claim 23, wherein the housing is formed from a resinous material that encapsulates the capacitor element.

25. The solid electrolytic capacitor of claim 23, wherein the housing defines an interior cavity within which the capacitor element is positioned, wherein the interior cavity has a gaseous atmosphere.

26. The solid electrolytic capacitor of claim 1, wherein the anode body includes tantalum.

27. The solid electrolytic capacitor of claim 1, wherein the capacitor element further comprises a cathode coating that contains a metal particle layer that overlies the solid electrolyte, wherein the metal particle layer includes a plurality of conductive metal particles.

28. The solid electrolytic capacitor of claim 1, wherein the capacitor exhibits a breakdown voltage of about 85 volts or more.

29. The solid electrolytic capacitor of claim 1, wherein the capacitor exhibits a capacitance recovery of about 80% or more at a frequency of 120 Hz.

* * * * *